United States Patent
Smtih et al.

(10) Patent No.: US 9,212,069 B2
(45) Date of Patent: Dec. 15, 2015

(54) FLUID TREATMENT SYSTEMS, METHODS AND APPLICATIONS

(71) Applicants: Jay N. Smtih, Bloomfield, NY (US); Samuel W. Gowan, Ballston Lake, NY (US)

(72) Inventors: Jay N. Smtih, Bloomfield, NY (US); Samuel W. Gowan, Ballston Lake, NY (US)

(73) Assignee: Salt Water Solutions, LLC, Avon, NY (US)

( * ) Notice: Subject to any disclaimer, the term of this patent is extended or adjusted under 35 U.S.C. 154(b) by 0 days.

(21) Appl. No.: 14/236,393

(22) PCT Filed: Mar. 20, 2013

(86) PCT No.: PCT/US2013/033066
§ 371 (c)(1),
(2) Date: Jan. 31, 2014

(87) PCT Pub. No.: WO2013/142556
PCT Pub. Date: Sep. 26, 2013

(65) Prior Publication Data
US 2015/0034564 A1 Feb. 5, 2015

Related U.S. Application Data

(60) Provisional application No. 61/613,714, filed on Mar. 21, 2012.

(51) Int. Cl.
*B01D 9/00* (2006.01)
*B01D 9/02* (2006.01)
(Continued)

(52) U.S. Cl.
CPC .............. *C02F 1/042* (2013.01); *B01D 9/0022* (2013.01); *B01D 9/0031* (2013.01);
(Continued)

(58) Field of Classification Search
CPC .......... B01D 9/00; B01D 9/02; B01D 9/0063; B01D 2009/0086; B01D 17/0217; B01D 21/26; B01D 21/262; B01D 21/267; B01D 9/0022; B01D 9/0031; B01D 9/0059; C02F 1/02; C02F 1/04; C02F 1/042; C02F 2101/12; C02F 2209/02; C02F 2209/03; C02F 1/12; C02F 1/38; C02F 1/385; C02F 5/30; C02F 2201/5218; C02F 2301/046; C01D 3/04; C01D 3/06; C01F 5/30
USPC ......... 23/295.1, 299, 300; 210/149, 175, 182, 210/194, 195.1, 511, 639, 739, 741, 742, 210/774, 805, 806; 423/158, 184, 499.4, 423/499.5
See application file for complete search history.

(56) References Cited

U.S. PATENT DOCUMENTS 2,366,792 A * 1/1945 Kirkbride .................. 423/658.5
3,250,081 A * 5/1966 Othmer .......................... 62/535
(Continued)

FOREIGN PATENT DOCUMENTS

WO 2010026589 A1 3/2010
WO 2010135561 A2 11/2010

*Primary Examiner* — Joseph Drodge
(74) *Attorney, Agent, or Firm* — William Greener; Alek P. Szecsy; Bond, Schoeneck & King, PLLC

(57) ABSTRACT

A fluid (i.e., generally water or wastewater) treatment system and associated methods provide for effectively treating the fluid (i.e., generally water or wastewater containing at least a plurality of salts) to provide a separated pure fluid (i.e., generally water) and a separated impurity (i.e., generally a salt). Also provided are a method for detecting or determining the need for a controlled process intervention to prevent the plugging of system components in a fluid (i.e., generally water) treatment system, and a process for preventing the plugging of the system components in the fluid (i.e., generally water) treatment system.

19 Claims, 2 Drawing Sheets

(51) Int. Cl.
  *C02F 1/00* (2006.01)
  *C02F 1/38* (2006.01)
  *C02F 1/04* (2006.01)
  *C02F 11/12* (2006.01)
  *C02F 1/52* (2006.01)
  *C02F 101/12* (2006.01)

(52) U.S. Cl.
  CPC ........... *B01D 9/0059* (2013.01); *B01D 9/0063* (2013.01); *B01D 9/02* (2013.01); *C02F 1/048* (2013.01); *C02F 1/38* (2013.01); *C02F 1/385* (2013.01); *C02F 11/12* (2013.01); *C02F 2001/5218* (2013.01); *C02F 2101/12* (2013.01); *C02F 2209/02* (2013.01); *C02F 2209/03* (2013.01); *C02F 2301/046* (2013.01)

(56) References Cited

U.S. PATENT DOCUMENTS

| | | | | |
|---|---|---|---|---|
| 3,361,647 A | * | 1/1968 | Brown et al. | 203/11 |
| 3,796,651 A | * | 3/1974 | Rojey | 208/24 |
| 3,885,399 A | * | 5/1975 | Campbell | 62/123 |
| 4,091,635 A | * | 5/1978 | Ogman | 62/123 |
| 4,180,547 A | * | 12/1979 | Chirico | 423/197 |
| 4,263,010 A | * | 4/1981 | Randolph | 23/295 R |
| 5,656,152 A | * | 8/1997 | McLaughlin et al. | 208/95 |
| 5,895,523 A | * | 4/1999 | Rendall et al. | 106/400 |
| 8,158,097 B2 | | 4/2012 | DiTommaso et al. | |
| 8,597,521 B1 | * | 12/2013 | Harrison | 210/722 |
| 8,877,690 B2 | * | 11/2014 | Keister | 507/200 |
| 2003/0217979 A1 | * | 11/2003 | Chen | 210/758 |
| 2004/0128002 A1 | * | 7/2004 | Frampton et al. | 700/31 |
| 2006/0060532 A1 | * | 3/2006 | Davis | 210/652 |
| 2009/0037003 A1 | * | 2/2009 | Wang | 700/53 |
| 2010/0163471 A1 | | 7/2010 | Elyanow et al. | |
| 2010/0219372 A1 | * | 9/2010 | Hook et al. | 252/182.32 |
| 2011/0274599 A1 | | 11/2011 | Hughes et al. | |
| 2011/0303607 A1 | * | 12/2011 | Vora et al. | 210/639 |
| 2012/0160753 A1 | * | 6/2012 | Vora et al. | 210/175 |

* cited by examiner

FLUID TREATMENT SYSTEMS, METHODS AND APPLICATIONS

CROSS-REFERENCE TO RELATED APPLICATION

This application is related to, and derives priority from, U.S. Provisional Patent Application Ser. No. 61/613,714, filed 21 Mar. 2012 and titled Water Treatment System, Method and Applications, the content of which is incorporated herein fully by reference.

BACKGROUND OF THE INVENTION

1. Field of the Invention

Embodiments relate generally to fluid treatment to remove impurities from a fluid. More particularly, embodiments relate to treatment of impure water to remove salt(s) and/or other impurities from the impure water.

2. Description of the Related Art

Evaporator systems are known for separating salt from impure water in which the salt is dissolved. Evaporator systems work by evaporating or vaporizing the water into a gaseous state so that the gaseous state water can be separated from the salt and remaining impure liquid state water. One example of an evaporator system is a large kettle of brine, slowly boiling away its water to yield sodium chloride salt for table use.

Given the need for purified fluids, desirable are additional systems and methods for separating impurities from fluids generally, and more particularly for separating salt impurities from impure water.

SUMMARY

Additional evaporator systems for separating salt from water have also been developed and may sometimes be referred to as crystallizer systems. Crystallizer systems may utilize a substantially continuous feed crystallizer to separate gaseous state water from a salt solution (or "slurry") under process. In centrifuge-including crystallizer systems, the process includes a centrifuge to mechanically separate (relatively high salt-concentration) crystallizer output slurry into salt end product and water (in the form of a relatively low salt-concentration centrifuge-output slurry). Other components may be utilized in such a crystallizer system, such as but not limited to hydrocyclones, pumps, valves, tanks (including concentrate tanks), mixing chambers, and clean water supply sub-systems, which are utilized to separate heavier and lighter slurries.

Crystallizer systems recirculate slurry through a crystallizer. Such recirculation provides that after a substantially continuous stream of crystallizer-output slurry exits the crystallizer, at least some portion of that crystallizer-output slurry will end up back in the crystallizer, generally mixed with "fresh" slurry having a relatively high salt concentration before, and/or while, it is re-fed back into the crystallizer.

A disadvantage of using a crystallizer system to process brine solutions (and especially multi-chloride brine solutions) is the eventual scaling and plugging of portions of the system (i.e., especially the heat exchanger). This scaling and/or plugging results from chemical precipitation. The scaling and plugging conventionally mandate a system shutdown that generally includes draining, dismantlement, and manual cleaning (i.e., rodding out) of the heat exchanger tubes. This clean-up is recognized as a necessary "expense" in terms of system down time, in terms of wear on the system, and/or in terms of energy consumed by the system.

An embodiment is a crystallizer-type water treatment system. The system provides for selective dilution (i.e., the addition of low- or zero-salt-concentrate water) to the crystallizer-input slurry. A further embodiment is a crystallizer-type system-based water treatment method wherein the aforementioned selective dilution is controlled, in one aspect by humans, and in another aspect by automatic computer control. This selective dilution, however implemented, is utilized to clean out at least some of the scaling and plugging of system components on an intermittent basis and to reduce and/or eliminate the need to shut down the crystallizer system in order to clean precipitate out of the various components. Another embodiment is a method to detect or determine the need for a controlled process intervention to prevent the plugging of system components, (e.g., the heat exchanger tubes).

According to various aspects, the need for a controlled process intervention may be determined based upon one or more of the following factors: (1) a change in vacuum in an evaporator vessel; (2) a change in amperage in a recirculation pump; (3) a change in pressure across a heat exchanger; (4) a change in noise in a recirculation pump; (5) a change in temperature across the heat exchanger; (6) a change in temperature in the evaporator vessel; and (7) a plugging of a hydrocyclone or its related pump.

A related and subsidiary embodiment includes a method for producing merchandisable end products using the embodied water treatment system and methods. These end products include purified and/or distilled water, various salts such as but not limited to sodium chloride, calcium chloride, magnesium chloride, and optionally other possible products. The various salts, such as but not limited to sodium chloride, calcium chloride and magnesium chloride may be provided as individually separated components predicated upon differences in water solubility of the various salts.

Various advantages and benefits of the embodiments include: (1) a wastewater treatment (and/or salt production) system that stays cleaner (for example, unplugged, little or no scaling) longer; (2) a wastewater treatment (and/or salt production) system with improved performance and/or reliability; (3) a wastewater treatment (and/or salt production) system with improved time and/or cost efficiency.

A particular fluid treatment system in accordance with the embodiments includes: (1) a continuous feed style crystallizer; (2) a feed stock supply sub-system; and (3) a dilution sub-system. Within this particular fluid treatment system, the crystallizer is connected in fluid communication with the feed stock supply sub-system so that the crystallizer receives a feed stock, including a solvent and at least one impurity, from the feed stock supply sub-system. Within this particular fluid treatment system, the dilution sub-system is designed to selectively add a dilution fluid to a crystallizer-input feed stock fluid stream that is fed into the crystallizer in a substantially continuous manner.

A particular fluid treatment method in accordance with the embodiments includes providing a fluid treatment system comprising: (1) a continuous feed style crystallizer; (2) a feed stock supply sub-system; and (3) a dilution sub-system. Within this particular method the crystallizer is connected in fluid communication with the feed stock supply sub-system so that the crystallizer receives a feed stock, including a solvent and at least one impurity, from the feed stock supply sub-system. Within this particular method the dilution sub-system is designed to selectively add a dilution fluid to a crystallizer-input fluid stream that is fed into the crystallizer in a substantially continuous manner. This particular method also includes measuring an operational parameter with respect to the fluid treatment system when operating the fluid treatment system. This particular method also includes introducing from the dilution sub-system into the crystallizer-input fluid stream the dilution fluid predicated upon a deviation of the measured value of the operational parameter from an expected value of the operational parameter.

A particular water treatment method in accordance with the embodiments includes providing a water treatment system comprising: (1) a continuous feed style crystallizer; (2) a feed stock supply sub-system; (3) a dilution sub-system; and (4) a recirculation system. Within this particular method the crystallizer is connected in fluid communication with the feed stock fluid sub-system so that the crystallizer receives feed stock, including water and salt(s), from the feed stock supply sub-system. Within this particular method the dilution sub-system selectively adds a dilution fluid to a crystallizer-input fluid stream that is fed into the crystallizer in a substantially continuous manner. Within this particular method the recirculation sub-system is in fluid communication with the crystallizer system and designed for: (1) recirculation of feed stock with respect to the crystallizer; and (2) end product separation from the water treatment system. This particular method also includes introducing an aqueous solution comprising at least one salt into the crystallizer. This particular method also includes harvesting from the recirculation system purified water and the at least one salt.

BRIEF DESCRIPTION OF THE DRAWINGS

The objects, features and advantages of the embodiments are understood within the context of the Detailed Description of the Non-Limiting Exemplary Embodiments, as set forth below. The Detailed Description of the Non-Limiting Exemplary Embodiments is understood within the context of the accompanying drawings, which form a material part of this disclosure, wherein.

DETAILED DESCRIPTION OF NON-LIMITING EXEMPLARY EMBODIMENTS

While the following description is directed most particularly towards separation of salt impurities from water, the embodiments more generally are directed towards separation of impurities from solvents. Such solvents may include, but are not limited to water, other inorganic solvents, mixed organic and inorganic solvents and organic solvents. Such impurities may include, but are not limited to solid impurities (i.e., including but not limited to salts) and liquid impurities.

Figure 1:
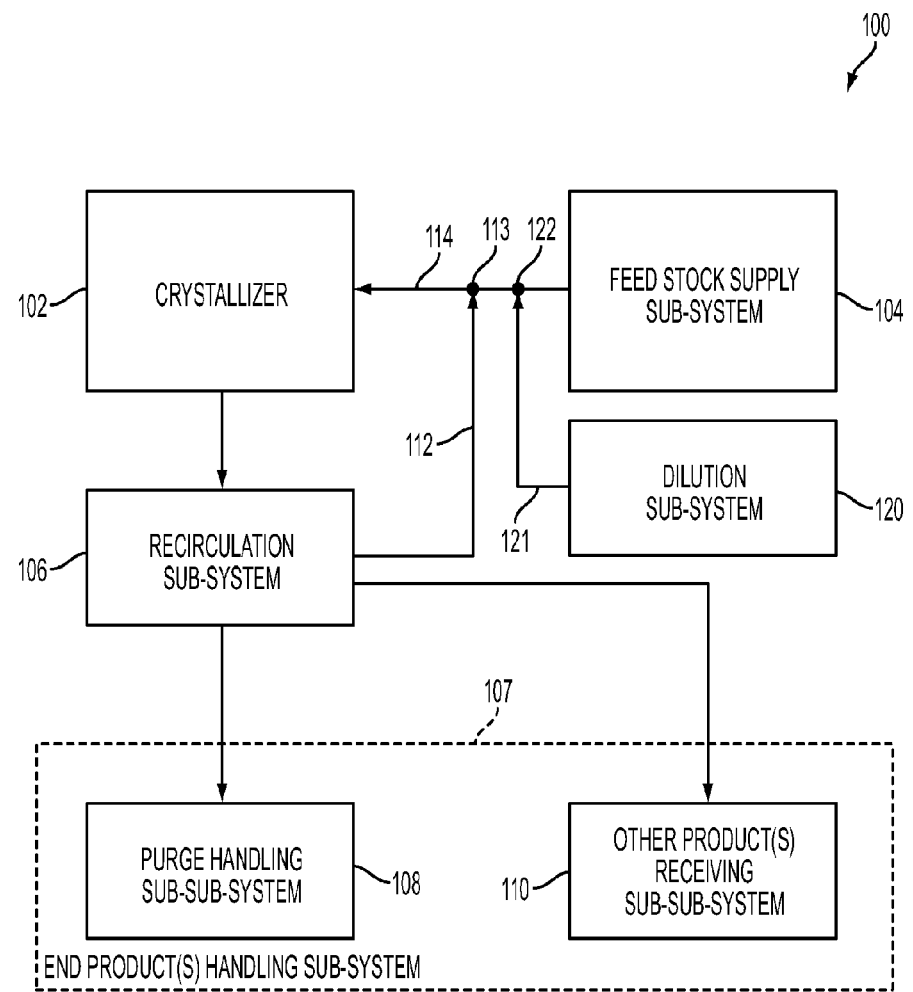
FIG. 1 shows a block flowchart schematic diagram of a water treatment system in accordance with a first embodiment.

Referring now to FIG. 1, water (i.e., wastewater) treatment system 100 includes a crystallizer 102 (including a feed pipe 114). A feed stock supply sub-system 104 supplies the crystallizer 102 with a feed stock. A recirculation sub-system 106 (including a recirculation loop 112 and a recirculation connection 113) provides for recirculation of the feed stock with respect to the crystallizer 102, and also in-part for end product handling with respect to the water treatment system 100. An end product(s) handling sub-system 107 (including a purge handling sub-system 108 and other product(s) receiving sub-system 110) is supplied by the recirculation sub-system 106. A dilution sub-system 120, including a dilution fluid supply line 121 and a dilution mixing juncture 122 feed the crystallizer 102 at the feed pipe 114. The dilution sub-system 120 selectively supplies dilution fluid (for example, pure water) through the dilution fluid supply line 121. When the dilution fluid is selectively supplied, it is supplied through the dilution fluid supply line 121 to the dilution mixing juncture 122.

The selective addition of the dilution fluid to the crystallizer 102 feed-stock inputs at the dilution mixing juncture 122 may be intermittent, and the intermittent addition of the dilution fluid may be periodic. Alternatively, the addition of the dilution fluid may be based upon a predetermined schedule. As a further alternative, the addition of the dilution fluid may be based upon direct, and/or indirect, detection of scaling and/or plugging in one or more components of the crystallizer system. This last alternative of detecting scaling and/or plugging will be further discussed below in more detail.

The selective addition of dilution fluid may be selective in that the dilution fluid is turned on, or off, at any given time according to the selective control that is exercised by human users and/or hardware-based logic. Additionally, or alternatively, the selective addition of dilution fluid may be selective in the sense that the rate of addition of dilution fluid is selectively controlled. For example, dilution fluid may be continuously supplied while varying the rate of addition of dilution fluid so that scaling and/or plugging are sufficiently compensated-for on an ongoing basis. Additionally, or alternatively, the composition of the dilution fluid could be changed depending upon the degree and/or nature of the scaling and/or plugging. As an example of selective control of the composition of dilution fluid, scale-removing additives could be selectively added to the dilution fluid based upon the detected extent and/or the detected identity of the precipitates forming the scale. This selective addition of dilution fluid is believed to advantageously prevent and/or reduce scaling, plugging and/or other types of contamination. It will reduce or eliminate the need to have shutdowns in order to take conventional cleaning measures to prevent scaling and/or plugging.

Figure 2:
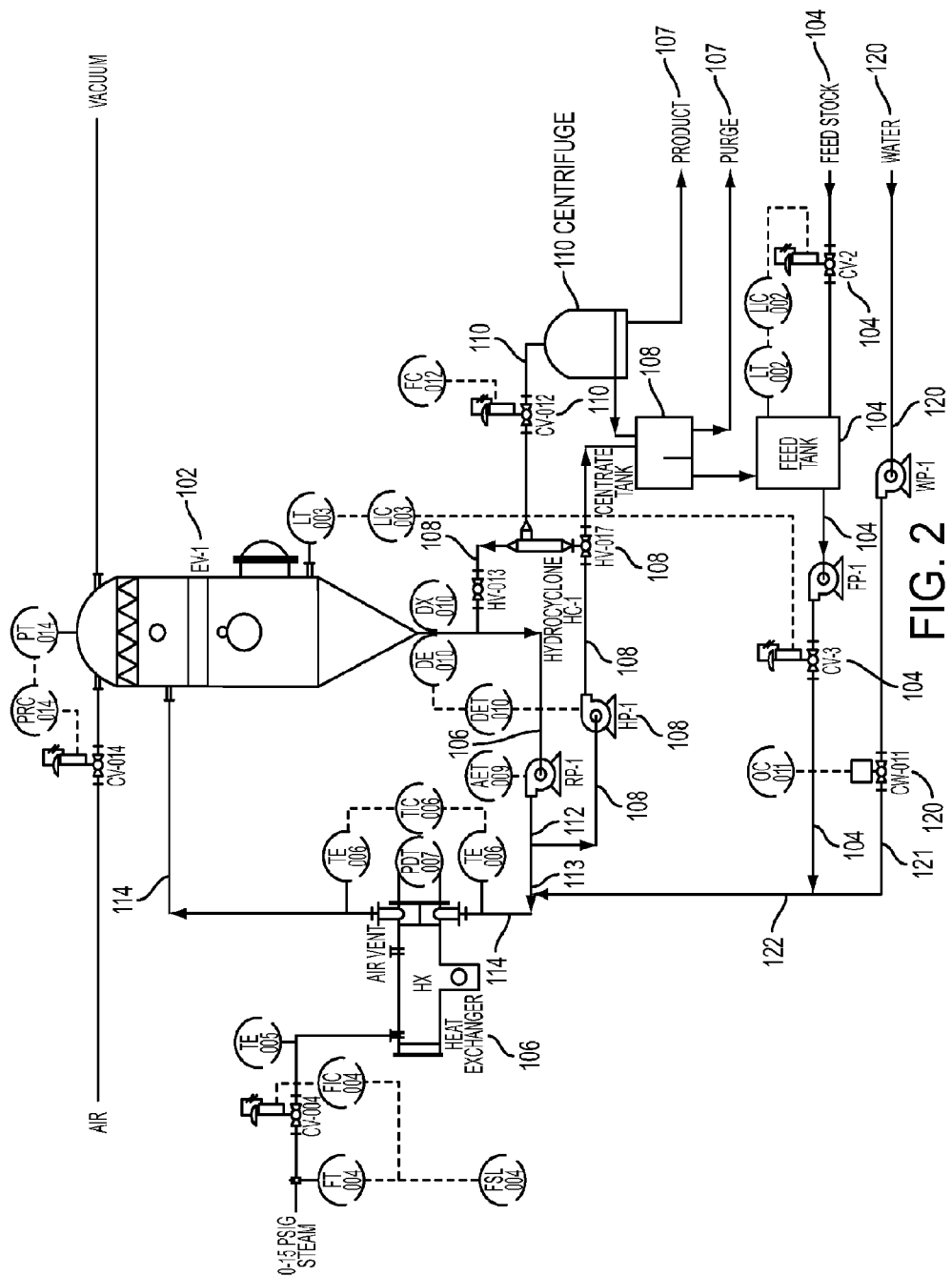
FIG. 2 shows a process flow schematic diagram of a water treatment system in accordance with a second embodiment.

Referring now to FIG. 2, a centrifuge-including crystallizer system 200 may be more specifically referred to as an evaporative induced circulation crystallizer. System 200, along with some associated processes will now be described. System 200 produces super saturation of a multi-chloride brine solution by evaporating (i.e., boiling off) water. A typical crystallizer is shown in the attached FIG. 2. This design introduces a raw feed stock into a recirculation loop where it is mixed with saturated brine. The brine within the recirculation loop recirculates through a main pump RP-1, a heat exchanger HX and an evaporator vessel EV-1. The evaporator vessel EV-1 pressure is controlled via a vacuum source that controls to −28 in. Hg. The recirculation loop is heated via the heat exchanger HX and a 15 lb steam supply. A side stream hydrocyclone pump HP-1 and hydrocyclone HC-1 draw the liquid solid slurry from the recirculation loop, process classify the solids and feed this slurry into a centrifuge where the solids are further separated from the liquid. The solids are transported to a dryer and then to a material handling system for storage and packaging. The saturated brine from the centrifuge is fed to a centrate (i.e., concentrate) receiver where the heavy liquid is separated from the light liquid. The heavy liquid is purged to storage tanks and the light liquid dilutes back to the brine feed where it acts as a seed stock enhancing crystal growth. Important factors to consider in making this process as illustrated in FIG. 2 work efficiently include recirculation rate, velocity, temperature, and crystallizer process retention time.

All remaining components as illustrated within FIG. 2 which are not specifically described above or below are otherwise standard connections, fittings, gauges or related components.

In an exemplary aspect, a human operator on duty may determine when to apply a dilution fluid to the evaporator vessel EV-1 and also to what degree to apply the dilution fluid. In this way the human operator exercises selective control of the addition of the dilution fluid. Accordingly, the operator decides when addition of the dilution fluid should commence (the "evaporator vessel dilution process.") In making this determination about when to commence dilution, factors to be considered may include, but are not limited to, temperature, vacuum, the change in pressure across the heat exchanger, and an increase in recirculation pump amperage.

When it is decided that the evaporator vessel (EV-1) (or related component within the recirculation loop) is to be diluted, an operator may make note in a shift log of a start time of the dilution. In this non-limiting embodiment, after the decision is made to commence the evaporator vessel dilution process, the next step is to switch the feed control mode from brine to water (i.e., the dilution fluid) while maintaining a sufficient fluid level within the evaporator vessel EV-1. The brine line supply line will be flushed during this same process.

It may be advantageous to monitor the solids percentage at the hydrocyclone HC-1 depending on the solids present, and to lower the feed set point to the centrifuge as the available solids decrease.

Once the brine slurry within the evaporator vessel EV-1 has been reduced to saturation levels by the addition of the dilution fluid, a brine return valve HV-013 is closed. A process stream output from the hydro clone pump HP-1 will then be diverted from the centrifuge to the centrate tank via a valve HV-017.

The level of the evaporator vessel EV-1 should generally be increased during the dilution process. It may be particularly advantageous to do this in 2% increments throughout the process as opposed to doing it all at once, during the initial switch and/or the final minutes before the hydrocyclone HC-1 is turned off. Such an increase in level may help to: (1) relieve any of the fouling issues that necessitated the dilution; (2) speed up the dilution of the final solids, which will then allow the operators to switch feed from centrifuge to feeder tank in a timelier manner; and/or (3) to push saturation below 100%.

In case of a spike in amperage, A pressure and/or temperature at any time during the dilution process, the water feed rate may be increased to bring these excursions back under control.

Once the saturation level of the evaporator vessel EV-1 has reached 90%, either by densitometer or manual test using a graduated cylinder and salometer, the hydrocyclone HC-1 will need to be disabled. To disable the hydrocyclone HC-1: (i) flush it; (ii) with the pump running at 65% or lower, open hydrocyclone HV-018 flush valve and close-off feed from the evaporator vessel EV-1 recirculation loop; (iii) disable the hydrocyclone HC-1 in the control room; (iv) close the valve over the hydrocyclone HV-013 and open test port TP-019 to allow all salt and brine to be flushed out of the pump and associated piping; (v) close the test port valve then close the hydrocyclone flush valve HV-018.

Finally, one may switch the evaporator vessel EV-1 feed from water back to brine and lower the evaporator vessel EV-l process level back to a normal operating set point. One may also monitor the saturation/solids within evaporator vessel EV-1. Once solids within the evaporator vessel EV-1 reach pre-dilution levels then the hydrocyclone pump HP-1 should be restarted as follows: (i) open the feed from the evaporator vessel EV-1 to hydrocyclone HC-1 and the valve HV-013 above the hydrocyclone HC-1; (ii) enable the hydrocyclone HC-1 and then open the hydrocyclone return valve HV-017; and (iii) increase the speed of the hydrocyclone pump HP-1 as solids increase to pre-dilution levels.

Below are listed the symptoms that are indicative of plugging in the evaporator vessel EV-1 or related components. There are different levels of urgency and they are stratified into Initial, intermediate and extreme. Each level is worthy of dilution depending upon conditions in the processing facility.

Initial Signs
- slight loss of vacuum in the evaporator vessel EV-1 (+1.5 in Hg)
- slight increase of amperage in the recirculation pump RP-1 (+2 amps)
- slight increase in pressure across the heat exchanger HX-1 (+0.5 psi)
- slight increase in noise of the recirculation pump RP-1
- slight increase in $\Delta T$ across the heat exchanger HX-1 (+1*F)
- slight increase in temperature in the evaporator vessel EV-1 (+2*F)
- slight plugging of the hydrocyclone HC-1 (<1× per hour)

These signs can also be indicative of other issues. For example and without limitation an increase in the percent of solids within the evaporator vessel EV-1 can increase temperature. The recirculation pump RP-1 for the evaporator vessel EV-1 does go through stages of increased amperage. Increased pressure across the heat exchanger HX can also be caused by high temperatures and increased percentages of solids.

The dilution process should only be started during this time frame if there are multiple contributing factors.

Intermediate Signs
- increased loss of vacuum in the evaporator vessel (+2 in Hg)
- increase of amperage in the recirculation pump (+3-4 amps)
- increase in pressure across the heat exchanger (+1.5-2 psi)
- increase in noise of the recirculation pump
- increase in $\Delta T$ across the heat exchanger (+2*F)
- increase in temperature in the evaporator vessel (+3*F)
- moderate plugging of the hydrocyclone HC-1 (1-2× per hour)

This is the ideal time to start the dilution process.

Extreme Signs
- significant loss of vacuum in the evaporator vessel (+2.5-3 in Hg)
- significant increase of amperage in the recirculation pump (+4 amps)
- significant increase in pressure across the heat exchanger (+2.5 psi)
- increase in noise of the recirculation pump
- significant increase in $\Delta T$ across the heat exchanger (+3-4*F)
- significant increase in temperature in the evaporator vessel (>5*F)
- frequent plugging of the hydrocyclone pump (>2× per hour)

This is either caused by a large solid substance travelling through the recirculation pump RP-1, some sort of system failure or operator error. It will be necessary to start the dilution process immediately.

All references, including publications, patent applications, and patents cited herein are hereby incorporated by reference in their entireties to the extent allowed, and as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein is merely intended to serve as a shorthand method of referring individually to each separate value falling within the range, unless otherwise indicated herein, and each separate value is incorporated into the specification as if it was individually recited herein.

All methods described herein may be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A fluid treatment system comprising:
   a continuous feed style crystallizer;
   a feed stock supply sub-system; and
   a dilution sub-system, wherein:
      the crystallizer is connected in fluid communication with the feed stock supply sub-system so that the crystallizer receives a feed stock, including a solvent and at least one impurity, from the feed stock supply sub-system through a crystallizer-input fluid stream;
      the dilution sub-system is designed to selectively add a dilution fluid to the crystallizer-input fluid stream, responsive to one or more measurements or determinations of one or more operational parameters of the system deviating from an expected value of the operational parameter while the crystallizer-input fluid stream is fed into the crystallizer in a substantially continuous manner, and
      an end product separation sub-system operative to produce purified water and at least one solid product.

2. The fluid treatment system of claim 1 further comprising a recirculation sub-system in fluid communication and recirculation with the crystallizer, the recirculation sub-system being designed for:
   recirculation of the feed stock with respect to the crystallizer; and
   at least one end product separation from the fluid treatment system.

3. The fluid treatment system of claim 2 further comprising an end product handling sub-system coupled with the recirculation sub-system and designed to handle the at least one end product separated from the fluid treatment system.

4. The fluid treatment system of claim 1 wherein the solvent comprises water and the at least one impurity comprises at least one salt.

5. The fluid treatment system of claim 1 wherein the dilution fluid is selectively added in an on-and-off fashion while the crystallizer-input fluid stream is fed into the crystallizer in the substantially continuous manner.

6. The fluid treatment system of claim 1 wherein the dilution fluid is selectively added in a variable rate of addition while the crystallizer-input fluid stream is fed into the crystallizer in the substantially continuous manner.

7. A fluid treatment method comprising:
   providing a fluid treatment system comprising:
      a continuous feed style crystallizer;
      a feed stock supply sub-system; and
      a dilution sub-system, wherein: the crystallizer is connected in fluid communication with the feed stock supply sub-system so that the crystallizer receives a feed stock, including a solvent and at least one impurity, from the feed stock supply sub-system through a crystallizer-input fluid stream; and
      the dilution sub-system is designed to selectively add a dilution fluid to the crystallizer-input fluid stream while the crystallizer-input fluid stream is fed into the crystallizer in a substantially continuous manner;
   measuring one or more operational parameters with respect to the fluid treatment system when operating the fluid treatment system;
   introducing from the dilution sub-system into the crystallizer-input fluid stream the dilution fluid predicated upon a deviation of the measured value of the operational parameter from an expected value of the operational parameter; and
   harvesting purified water and at least one solid product.

8. The method of claim 7 wherein the operational parameter is selected from the group consisting of:
   a vacuum in an evaporator vessel within a recirculation loop within the fluid treatment system;
   an amperage in a recirculation pump within the recirculation loop within the fluid treatment system;
   a pressure across a heat exchanger within the recirculation loop within the fluid treatment system;
   a noise in a recirculation pump within the recirculation loop within the fluid treatment system;
   a temperature across the heat exchanger within the recirculation loop within the fluid treatment system;
   a temperature in the evaporator vessel within the recirculation loop within the fluid treatment system; and
   a plugging of a hydrocyclone pump within the recirculation loop within the fluid treatment system.

9. The method of claim 7 wherein the fluid treatment system further comprises a recirculation sub-system in fluid communication and recirculation with the crystallizer, the recirculation sub-system being designed for:
   recirculation of a feed stock with respect to the crystallizer; and
   an end product separation from the fluid water treatment system.

10. The method of claim 9 wherein the fluid treatment system further comprises an end product handling sub-system coupled with the recirculation sub-system and designed to handle at least one end product separated by the fluid treatment system.

11. The method of claim 7 wherein the solvent comprises water and the at least one impurity comprises at least one salt.

12. The method of claim 7 wherein the addition of the dilution fluid is automatically determined.

13. The method of claim 7 wherein the addition of the dilution fluid is manually determined.

14. A water treatment method comprising:
 providing a water treatment system comprising:
  a continuous feed style crystallizer;
  a feed stock supply sub-system;
  a dilution sub-system; and
  a recirculation system, wherein:
   the crystallizer is connected in fluid communication with the feed stock fluid sub-system so that the crystallizer receives feed stock, including water and salt(s), from the feed stock supply sub-system;
   the dilution sub-system selectively adds a dilution fluid to a crystallizer-input fluid stream while the crystallizer-input fluid stream is fed into the crystallizer in a substantially continuous manner; and
   the recirculation sub-system is in fluid communication with the crystallizer system and designed for:
    recirculation of feed stock with respect to the crystallizer; and
    end product separation from the water treatment system;
 introducing an aqueous solution comprising at least one salt into the crystallizer; and
 harvesting from the recirculation system purified water and the at least one salt.

15. The method of claim 14 wherein the at least one salt is selected from the group consisting of sodium chloride, calcium chloride and magnesium chloride.

16. The method of claim 14 wherein the at least one salt comprises at least two salts selected from the group consisting of sodium chloride, calcium chloride and magnesium chloride.

17. The method of claim 16 wherein the at least two salts are separated predicated upon a solubility difference.

18. The method of claim 14 further comprising:
 measuring an operational parameter with respect to the fluid treatment system when operating the fluid treatment system; and
 introducing from the dilution sub-system into the crystallizer the dilution fluid predicated upon a deviation of the measured value of the operational parameter from an expected value of the operational parameter.

19. The method of claim 18 wherein the operational parameter is selected from the group consisting of:
 a vacuum in an evaporator vessel within a recirculation loop within the fluid treatment system;
 an amperage in a recirculation pump within the recirculation loop within the fluid treatment system;
 a pressure across a heat exchanger within the recirculation loop within the fluid treatment system;
 a noise in a recirculation pump within the recirculation loop within the fluid treatment system;
 a temperature across the heat exchanger within the recirculation loop within the fluid treatment system;
 a temperature in the evaporator vessel within the recirculation loop within the fluid treatment system; and
 a plugging of a hydrocyclone pump within the recirculation loop within the fluid treatment system.

* * * * *